(12) United States Patent
Yan

(10) Patent No.: US 11,660,918 B1
(45) Date of Patent: May 30, 2023

(54) TRAILER CONNECTOR SLEEVE LOCK

(71) Applicant: RunAn Yan, Huizhou (CN)

(72) Inventor: RunAn Yan, Huizhou (CN)

(*) Notice: Subject to any disclaimer, the term of this patent is extended or adjusted under 35 U.S.C. 154(b) by 0 days.

(21) Appl. No.: 17/980,011

(22) Filed: Nov. 3, 2022

(51) Int. Cl.
  *B60D 1/36* (2006.01)
  *B60D 1/66* (2006.01)
  *B60D 1/60* (2006.01)

(52) U.S. Cl.
  CPC ............... *B60D 1/36* (2013.01); *B60D 1/605* (2013.01); *B60D 1/66* (2013.01)

(58) Field of Classification Search
  CPC ............. B60D 1/36; B60D 1/66; B60D 1/605
  See application file for complete search history.

(56) References Cited

U.S. PATENT DOCUMENTS

| | | | | |
|---|---|---|---|---|
| 3,605,457 | A * | 9/1971 | Foster | B60D 1/60 280/507 |
| D388,383 | S * | 12/1997 | Foster | D12/162 |
| 5,775,139 | A * | 7/1998 | Sellers | B60D 1/60 70/164 |
| 6,598,432 | B1 * | 7/2003 | Dwyer | B60D 1/60 280/507 |
| 9,033,358 | B1 * | 5/2015 | Williamson | B60D 1/06 280/507 |
| 10,017,019 | B1 * | 7/2018 | Ludwig | B60S 9/04 |
| 10,513,159 | B2 * | 12/2019 | Odom | B60D 1/60 |
| 10,821,791 | B2 * | 11/2020 | Pritchard | B60D 1/60 |
| 11,535,072 | B2 * | 12/2022 | Williamson | B60D 1/06 |
| 2005/0252256 | A1 * | 11/2005 | Escalante | B60D 1/60 70/14 |
| 2006/0290101 | A1 * | 12/2006 | Rosenberg | B60D 1/60 280/507 |
| 2007/0063483 | A1 * | 3/2007 | Thomsen | B60D 1/60 280/507 |

* cited by examiner

*Primary Examiner* — Kevin Hurley
*Assistant Examiner* — Marlon A Arce

(57) ABSTRACT

The present invention discloses a trailer connector sleeve lock, comprising a lock cover, a lock tongue piece and a lock hole plate, wherein the lock hole plate is rotatably installed on the lock cover and is provided with a lock hole, and the lock hole plate rotates to the lock cover to serve as the side wall of the lock cover, they are spliced together to form a sleeve lock structure, wherein an opening is arranged above the sleeve lock structure, and the opening is smaller than the size of the lock tongue piece, wherein the lock tongue piece is provided with a lock tongue and is clamped in the sleeve lock structure, wherein the lock tongue extends out of the lock hole and is fixed through an additional lock. The advantageous effects of the present invention are that: the lock cover and the lock hole plate are spliced into a sleeve lock structure, and then the lock tongue piece is clamped in the sleeve lock structure, the lock tongue in the lock tongue piece extends out of the lock hole plate, and then the trailer is locked in such a manner that the lock tongue is fixed by the additional lock, and the installation is convenient. The four sides of the lock tongue piece are completely covered by the lock cover, and the lock tongue is inserted into the lock hole plate, so that a thief cannot damage the sleeve lock by cutting the lock tongue. The damage difficulty is high, the time-consuming is long, and the protection effect is good.

7 Claims, 5 Drawing Sheets

TRAILER CONNECTOR SLEEVE LOCK

TECHNICAL FIELD OF THE INVENTION

The present invention relates to the technical field of trailer auxiliary means, especially a trailer connector sleeve lock.

BACKGROUND OF THE INVENTION

Trailers are useful items when handling large items. Various trailers are manufactured for various tractors. Unfortunately, trailers cannot be protected from theft. If left unattended and without security, a thief need only have the appropriate vehicle and hitch to secure the trailer to the vehicle and steal it. Since the trailer is typically moved by the vehicle, the lock for the trailer typically prevents the trailer from being connected to other vehicles.

The hook structure of a gooseneck trailer typically consists of an attachment in the throat. When a trailer needs to be attached to a vehicle with a flat bed, the trailer connector needs to be positioned above the flat bed, and the traction ball of the vehicle needs to be connected to the interface at the bottom of the connector. Gooseneck trailers are usually bulky, so preventing a thief from connecting the traction ball to the trailer connector of the trailer on our part is an important means of theft protection. The trailer lock disclosed by the prior art has the defects of large volume, poor adaptability and difficulty in installation. Moreover, the lock tongue is mostly exposed outside and is easily cut by others, so that the effect of protecting the trailer from being stolen cannot be achieved.

SUMMARY OF THE INVENTION

The object of the present invention is to provide a trailer connector sleeve lock. The lock cover and the lock hole plate are spliced into a sleeve lock structure, and then the lock tongue piece is clamped in the sleeve lock structure, the lock tongue in the lock tongue piece extends out of the lock hole plate, and then the trailer is locked in such a manner that the lock tongue is fixed by an additional lock, and the installation is convenient. The four sides of the lock tongue piece are completely covered by the lock cover, and the lock tongue is inserted into the lock hole plate, so that a thief cannot damage the sleeve lock by cutting the lock tongue. The damage difficulty is high, the time-consuming is long, and the protection effect is good.

In order to realize the purpose of the present invention, the present invention provides the following technical solutions:

a trailer connector sleeve lock, comprising a lock cover, a lock tongue piece and a lock hole plate, wherein the lock hole plate is rotatably installed on the lock cover and is provided with a lock hole, and the lock hole plate rotates to the lock cover to serve as the side wall of the lock cover, they are spliced together to form a sleeve lock structure, wherein an opening is arranged above the sleeve lock structure, and the opening is smaller than the size of the lock tongue piece, wherein the lock tongue piece is provided with a lock tongue and is clamped in the sleeve lock structure, wherein the lock tongue extends out of the lock hole and is fixed through an additional lock.

Preferably, the lock tongue piece is provided with a limit position hole corresponding to the trailer connector. The lock tongue piece can be clamped on the trailer connector through the limit position hole, and the mounting position of the lock tongue piece can be positioned more simply.

Preferably, the lock is any one of a padlock or a round lock, so that when the lock tongue is fixed on the lock hole plate, the fixation is firm and is not easy to be pried by a thief.

Preferably, the lock hole plate is rotatably installed on the lock cover through a rotating shaft. The lock hole plate rotates around the rotating shaft to form two states of opening and closing of the sleeve lock structure.

Preferably, the lock cover is of a box body structure and comprises a bottom plate, a left side plate, a right side plate and a rear side plate, wherein the lock hole plate serves as the front side plate of the lock cover, and the lock hole plate, the left side plate, the right side plate and the rear side plate extend towards the top surface of the lock cover to form an opening. The box body structure wraps the trailer connector.

Preferably, the bottom plate, the left side plate, the right side plate and the rear side plate form the lock cover in a welded manner. The welding can improve the robustness of lock cover and is difficult to be pried open.

Preferably, the lock cover is of a spherical structure, and the lock tongue piece is an arc-shaped plate slightly larger than the opening of the sleeve lock structure. The spherical structure wraps the trailer connector.

As compared with the prior art, the present invention has the following advantageous effects:

The present invention comprises a lock cover, a lock hole plate and a lock tongue piece, wherein the lock cover has a missing side wall, which is filled through the lock hole plate, wherein the lock hole plate is rotatably installed on the lock cover and can be spliced together with the lock cover to form a sleeve lock structure, wherein an opening is arranged above the sleeve lock structure. The lock hole plate rotates, the sleeve lock structure is opened, the trailer connector is inserted into the sleeve lock structure from the position of the lock hole plate, the rod body of the trailer connector can be extended out of the opening, the lock tongue piece is inserted into the sleeve lock structure to cover the trailer connector, and the lock tongue piece and the trailer connector are clamped into the sleeve lock structure by turning the lock hole plate to close the sleeve lock structure. The four sides of the lock tongue piece are wrapped by the lock cover, and the lock tongue of the lock tongue piece extends out of the lock hole plate and is locked directly through the additional lock, and the lock tongue is not exposed on the outside of the sleeve lock. Since the lock tongue piece is larger than the size of opening, a thief need cut the lock cover to the area that the opening is larger than the lock tongue piece and can only dismantle the sleeve lock structure. The cutting area is large, and the time-consuming is long, so that there is little chance of the lock cover being damaged. Moreover, the lock tongue is mostly protected in the lock hole plate and is not exposed outside, so that the difficulty of cutting the lock tongue by a thief is higher, and the lock cover is less likely to be destroyed.

Secondly, the present invention only needs to put the trailer connector and the lock tongue piece into the sleeve lock structure, and then rotate the lock hole plate to close the sleeve lock structure to complete the installation, and the installation is very simple. Due to the closure of the opening through the lock tongue piece, the sleeve lock structure can adapt to most of the trailer connectors without slipping out of the opening, and the adaptability is good.

Therefore, the present invention provides a trailer connector sleeve lock. The four sides of the lock tongue piece are completely covered by the lock cover, and the lock tongue is inserted into the lock hole plate, so that a thief cannot damage the sleeve lock by cutting the lock tongue.

The damage difficulty is high, the time-consuming is long, and the protection effect is good.

DETAILED DESCRIPTION OF THE PREFERRED EMBODIMENT

Figure 1:
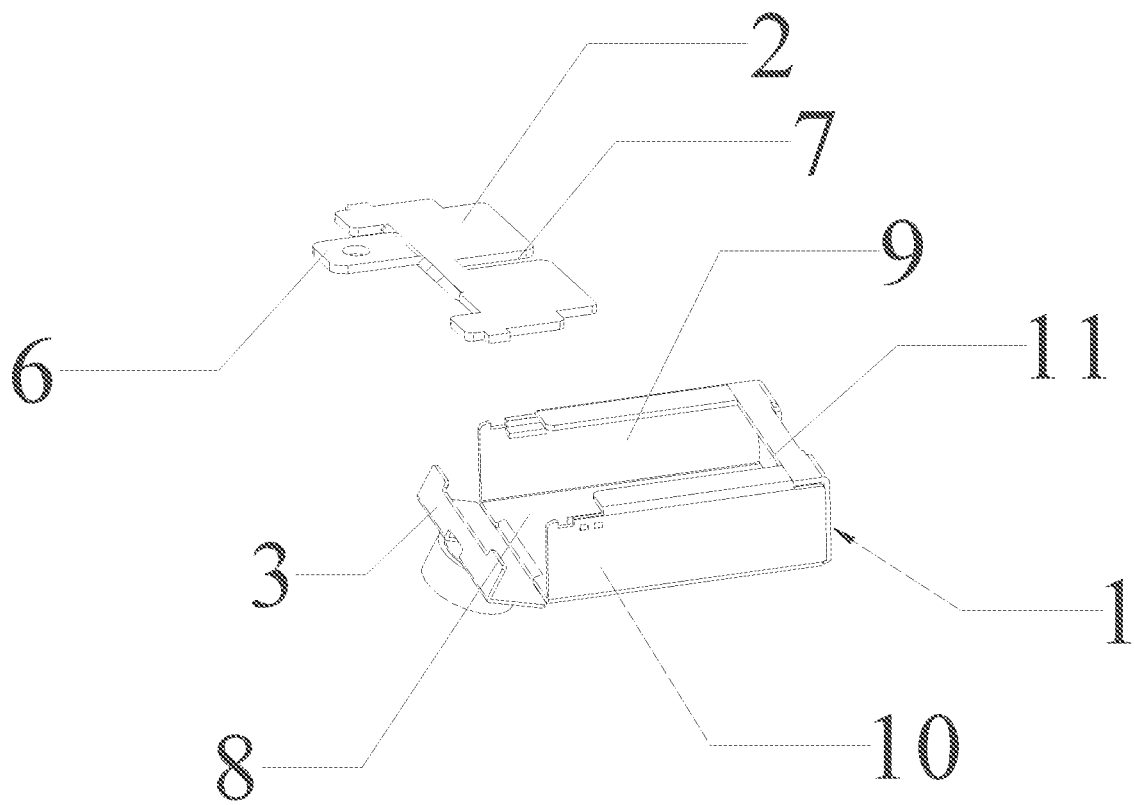
FIG. 1 is a split schematic view of the structure of the present invention.

The technical solutions of the embodiments of the present invention model will be clearly and entirely described below with the drawings of the embodiments of the present invention. Obviously, the described embodiments are just a part of the embodiments of the present invention, and are not all of them. All other embodiments that can be obtained by a person skilled in the art based on the embodiments of the present invention without any creative effort are included in the protection scope of the present invention.

It should be noted that, all the directional indications (such as up, down, left, right, front, rear . . . ) in the embodiments of the present invention are merely used for explaining the relative positional relationship and movement conditions and the like between each part under a certain posture (as shown in the drawings), if such a posture changes, then the directional indications are changed correspondingly.

In the present invention, such description involving "first" and "second" and the like are merely for the purpose of description, but cannot be understood as indicating or implying its relative importance or implicitly indicating the quantity of the indicated technical features. Therefore, the feature defined with "first" and "second" can explicitly or implicitly include at least one such feature; secondly, in the description of the present invention, "a plurality of" means at least two, for example, two, three and the like, unless otherwise specifically defined.

In the present invention, unless otherwise definitely prescribed and defined, the terms "connection", "connected", "fixed" and the like should be understood in its broad sense. For example, the "connection" may be a fixed connection, may also be a detachable connection or an integrated connection; may be a mechanical connection, may also be an electrical connection; and the "connected" may be directly connected and can also be indirectly connected through an intermediate medium, and can also be the internal communication inside two elements or an interaction relationship between two elements, unless otherwise definitely defined. The specific meaning of the above-mentioned terms in the present invention may be understood by those of ordinary skill in the art in light of specific circumstances.

In addition, the technical solutions between each embodiment in the present invention can be mutually combined, but should be on the basis that the technical solutions can be realized by those skilled in the art, when the combination of the technical solutions is contradictory or cannot be realized, it should be deemed that the combination of technical solutions does not exist and does not fall within the protection scope claimed by the present invention.

The embodiment of the present invention provides a trailer connector sleeve lock. The names of the components corresponding to the reference numerals in the figures are as follows: lock cover 1, lock tongue piece 2, lock hole plate 3, lock 4, opening 5, lock tongue 6, limit position hole 7, bottom plate 8, left side plate 9, right side plate 10, rear side plate 11, trailer connector sleeve lock 12.

Figure 2:
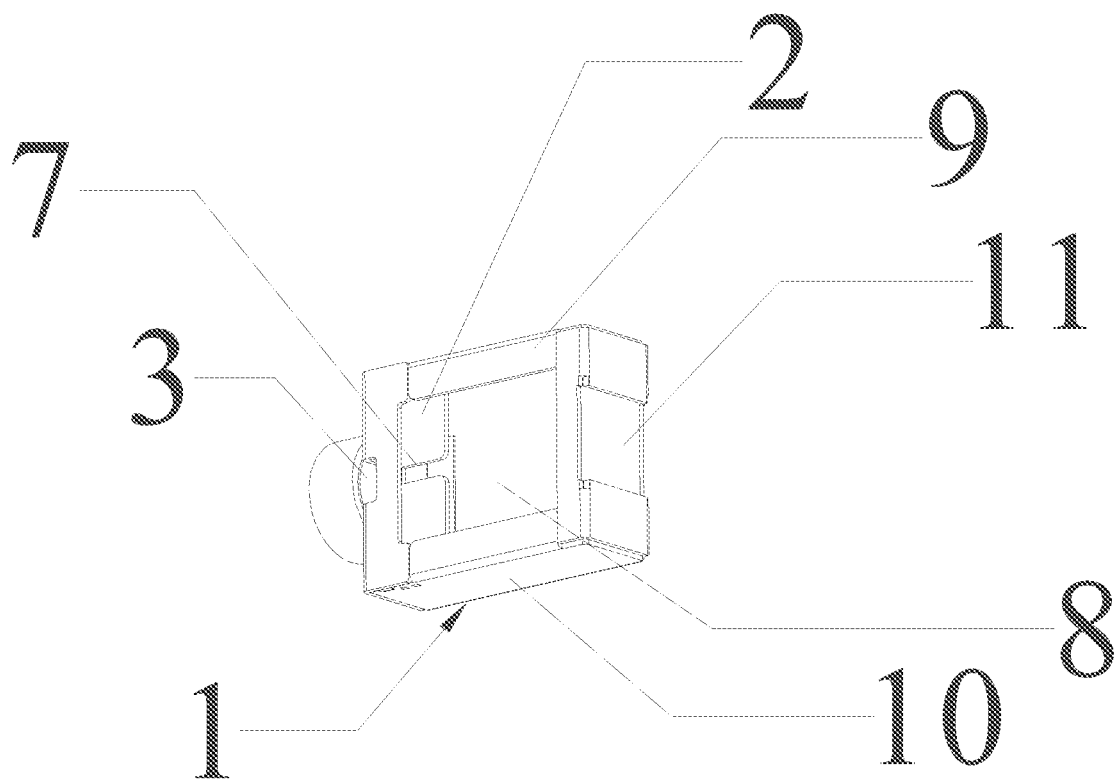
FIG. 2 is a schematic side view of the structure of the present invention.
Figure 3:
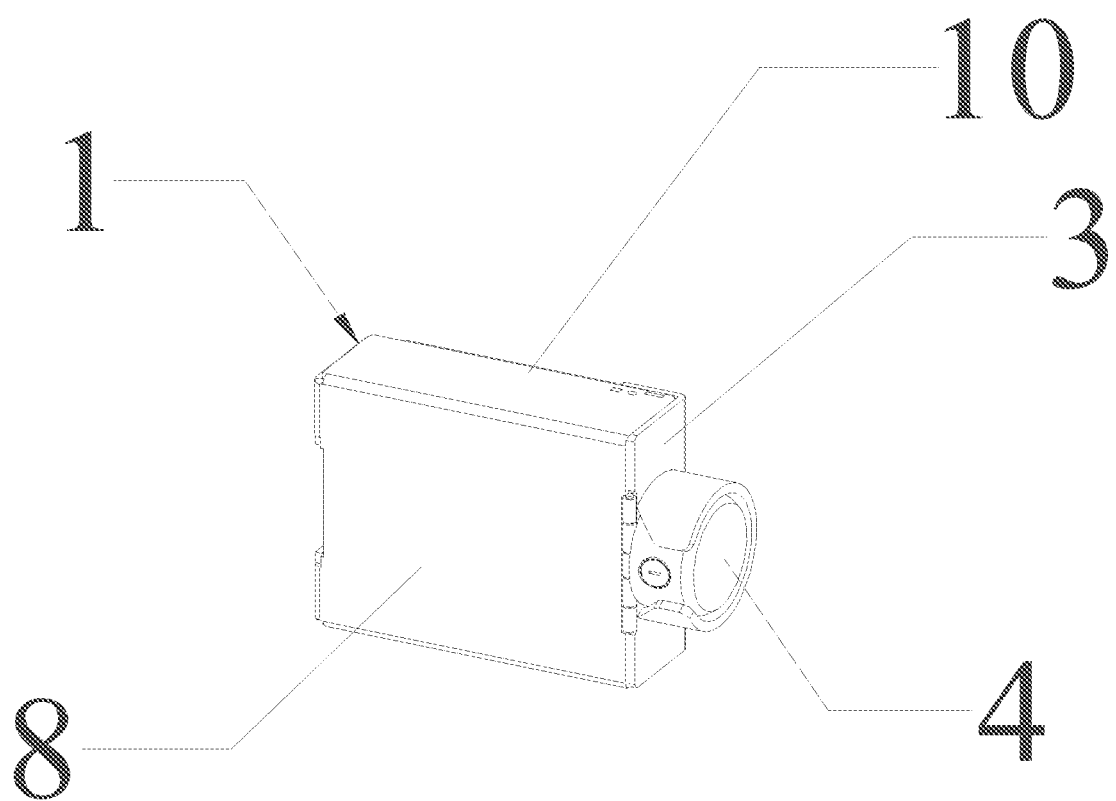
FIG. 3 is a schematic view of the structure of the bottom surface of the present invention.

As shown in FIGS. 1-3, it comprises a lock cover 1, a lock tongue piece 2 and a lock hole plate 3, wherein the lock hole plate 3 is rotatably installed on the lock cover 1 and is provided with a lock hole, the lock hole plate 3 and the lock cover 1 are combined to form a sleeve lock structure, which has two kinds of states of opening and closing according to the position of lock hole plate 3, the lock tongue piece 2 is directly stored in the lock cover 1 when not in use, and the lock tongue piece 2 is provided with a lock tongue 6.

Figure 4:
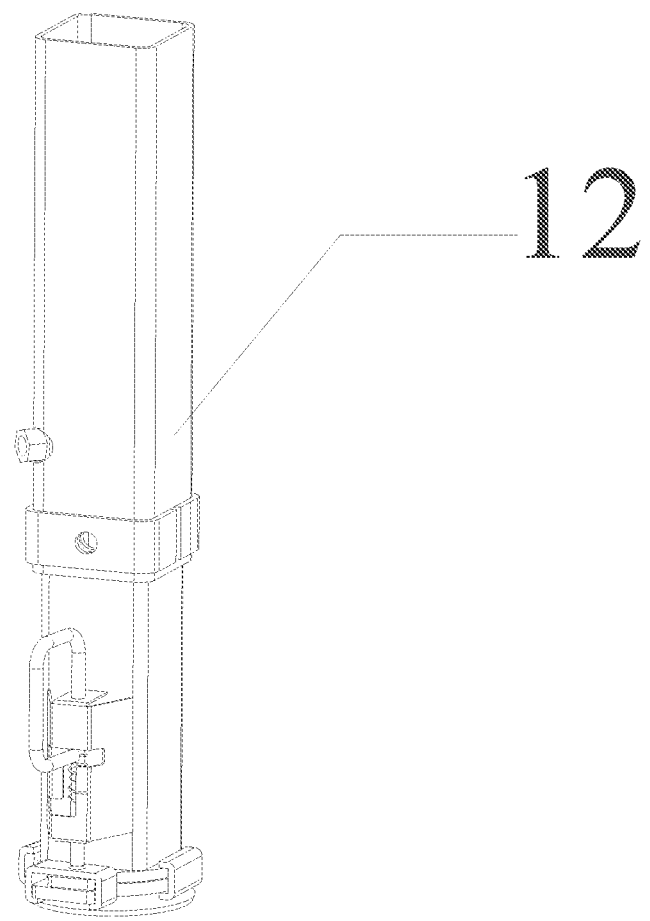
FIG. 4 is a schematic view of the structure of the trailer connector.
Figure 5:
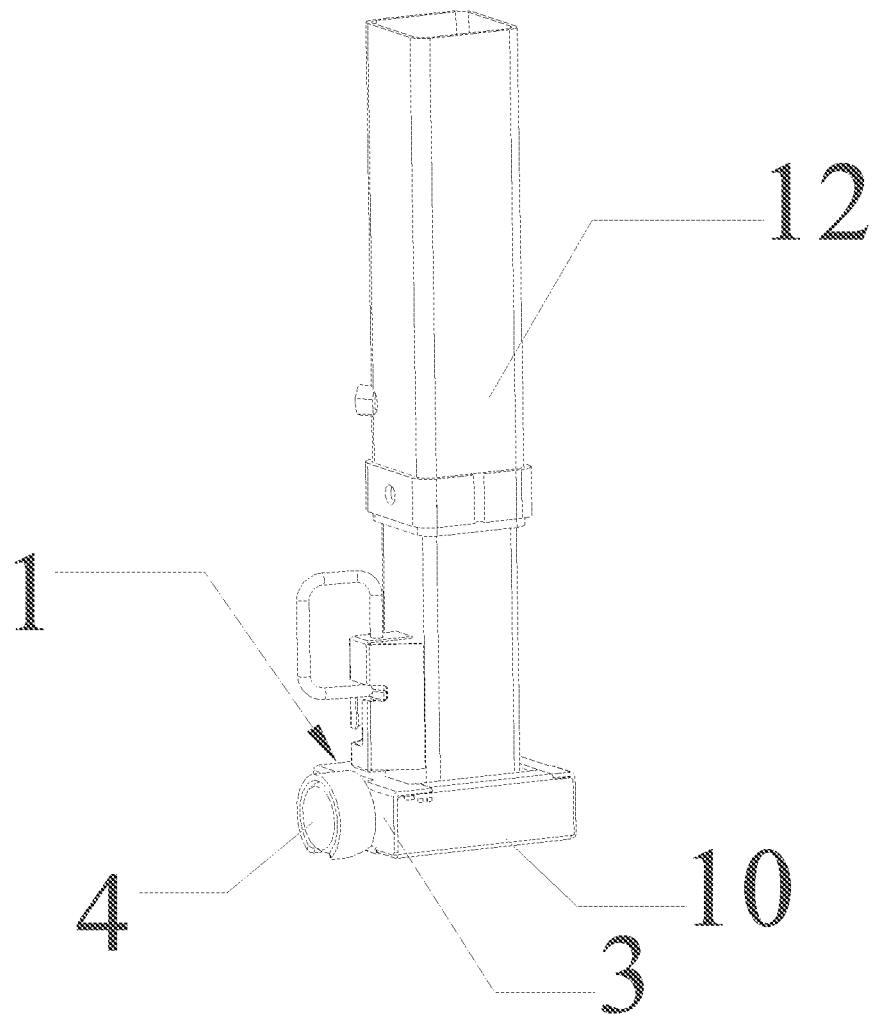
FIG. 5 is a schematic view of the assembly of the trailer connector of the present invention.

As shown in FIGS. 4-5, FIG. 4 is a schematic view of the trailer connector 12, FIG. 5 is a schematic view of locking the trailer connector 12 of the present invention. The use and working method of the present invention is as follows: rotating the lock hole plate 3, opening the sleeve lock structure, taking out the lock tongue piece 2, then inserting the trailer connector 12 into the lock cover 1, then placing the lock tongue piece 2 into the lock cover 1, covering the opening 5 with the lock tongue piece 2, rotating the lock hole plate 3 to be in contact with the lock cover 1, closing the sleeve lock structure, extending the lock tongue 6 out of the lock hole, fixing the lock tongue 6 through the additional lock 4, and completing the locking process of the trailer connector 12.

When the trailer is needed to be used, a user unlocks the lock with a key and rotates the lock hole plate 3, so that the sleeve lock structure is opened, the trailer connector 12 is taken out of the sleeve lock structure, and then the trailer connector 12 can be normally used.

The lock tongue piece 2 is provided with a limit position hole 7 corresponding to the trailer connector 12. The lock tongue piece 2 can be clamped on the trailer connector 12 through the limit position hole 7, and the mounting position of the lock tongue piece 2 can be positioned more simply.

The lock 4 is any one of a padlock or a round lock, so that when the lock tongue 6 is fixed on the lock hole plate 3, the fixation is firm and is not easy to be pried by a thief.

The lock hole plate 3 is rotatably installed on the lock cover 1 through a rotating shaft. The lock hole plate 3 rotates around the rotating shaft to form two states of opening and closing of the sleeve lock structure.

The lock cover 1 is of a box body structure and comprises a bottom plate 8, a left side plate 9, a right side plate 10 and a rear side plate 11, wherein the lock hole plate 3 serves as the front side plate of the lock cover 1, and the lock hole plate 3, the left side plate 9, the right side plate 10 and the rear side plate 11 extend towards the top surface of the lock cover 1 to form an opening 5. The box body structure wraps the trailer connector 12.

The bottom plate 8, the left side plate 9, the right side plate 10 and the rear side plate 11 form the lock cover 1 in a welded manner. The welding can improve the robustness of lock cover 1 and is difficult to be pried open.

Further, the lock cover 1 is of a spherical structure, and the lock tongue piece 2 is an arc-shaped plate slightly larger than the opening 5 of the sleeve lock structure. The spherical structure wraps the trailer connector 12.

As compared with the prior art, the present invention has the following advantageous effects:

The present invention comprises a lock cover 1, a lock hole plate 3 and a lock tongue piece 2, wherein the lock cover 1 has a missing side wall, which is filled through the lock hole plate 3, wherein the lock hole plate 3 is rotatably installed on the lock cover 1 and can be spliced together with the lock cover 1 to form a sleeve lock structure, wherein an opening 5 is arranged above the sleeve lock structure. The lock hole plate 3 rotates, the sleeve lock structure is opened, the trailer connector 12 is inserted into the sleeve lock structure from the position of the lock hole plate 3, the rod body of the trailer connector 12 can be extended out of the opening 5, the lock tongue piece 2 is inserted into the sleeve lock structure to cover the trailer connector 12, and the lock tongue piece 2 and the trailer connector 12 are clamped into the sleeve lock structure by turning the lock hole plate 3 to close the sleeve lock structure. The four sides of the lock tongue piece 2 are wrapped by the lock cover 1, and the lock tongue 6 of the lock tongue piece 2 extends out of the lock hole plate 3 and is locked directly through the additional lock 4, and the lock tongue 6 is not exposed on the outside of the sleeve lock. Since the lock tongue piece 2 is larger than the size of opening 5, a thief need cut the lock cover 1 to the area that the opening 5 is larger than the lock tongue piece 2 and can only dismantle the sleeve lock structure. The cutting area is large, and the time-consuming is long, so that there is little chance of the lock cover 1 being damaged. Moreover, the lock tongue 6 is, mostly protected in the lock hole plate 3 and is not exposed outside, so that the difficulty of cutting the lock tongue 6 by a thief is higher, and the lock cover 1 is less likely to be destroyed.

Secondly, the present invention only needs to put the trailer connector 12 and the lock tongue piece 2 into the sleeve lock structure, and then rotate the lock hole plate 3 to close the sleeve lock structure to complete the installation, and the installation is very simple. Due to the closure of the opening 5 through the lock tongue piece 2, the sleeve lock structure can adapt to most of the trailer connectors 12 without slipping out of the opening 5, and the adaptability is good.

Therefore, the present invention provides a trailer connector sleeve lock. The four sides of the lock tongue piece 2 are completely covered by the lock cover 1, and the lock tongue 6 is inserted into the lock hole plate 3, so that a thief cannot damage the sleeve lock by cutting the lock tongue 6. The damage difficulty is high, the time-consuming is long, and the protection effect is good.

The above described embodiments are only the preferred embodiments of the present invention. It should be noted that, the present invention is not limited to the above preferred embodiments, and the protection scope of the present invention is defined by the claims. For a person skilled in the art, on the premise of not departing away from the spirit and scope of the present invention, several improvements and modifications may also be made, and such improvements and modifications are also deemed to be within the protection scope of the present invention.

The invention claimed is:

1. A trailer connector sleeve lock, characterized in that it comprises a lock cover, a lock tongue piece and a lock hole plate, wherein the lock hole plate is rotatably installed on the lock cover and is provided with a lock hole, and the lock hole plate rotates to the lock cover to serve as a side wall of the lock cover, wherein the lock hole plate and the lock cover are spliced together to form a sleeve lock structure, wherein an opening is arranged above the sleeve lock structure, and the opening is smaller than the size of the lock tongue piece, wherein the lock tongue piece is provided with a lock tongue and is clamped in the sleeve lock structure, wherein the lock tongue extends out of the lock hole and is fixed through an additional lock.

2. The trailer connector sleeve lock according to claim 1, further comprising that the lock tongue piece is provided with a limit position hole corresponding to the trailer connector.

3. The trailer connector sleeve lock according to claim 1, further comprising that the lock is any one of a padlock or a round lock.

4. The trailer connector sleeve lock according to claim 1, further comprising that the lock hole plate is rotatably installed on the lock cover through a rotating shaft.

5. The trailer connector sleeve lock according to claim 1, further comprising that the lock cover is of a box body structure and comprises a bottom plate, a left side plate, a right side plate and a rear side plate, wherein the lock hole plate serves as the front side plate of the lock cover, and the lock hole plate, the left side plate, the right side plate and the rear side plate extend towards the top surface of the lock cover to form an opening.

6. The trailer connector sleeve lock according to claim 5, further comprising that the bottom plate, the left side plate, the right side plate and the rear side plate form the lock cover in a welded manner.

7. The trailer connector sleeve lock according to claim 1, further comprising that the lock cover is of a spherical structure, and the lock tongue piece is an arc-shaped plate slightly larger than the opening of the sleeve lock structure.

\* \* \* \* \*